United States Patent
Ochi et al.

(10) Patent No.: US 8,046,785 B2
(45) Date of Patent: Oct. 25, 2011

(54) OBJECTIVE LENS ACTUATOR AND A DISC APPARATUS APPLYING THE SAME THEREIN

(75) Inventors: Manabu Ochi, Hitachinaka (JP);
Katsuhiko Kimura, Kasumigaura (JP);
Takahiro Yamaguchi, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 57 days.

(21) Appl. No.: 12/540,447

(22) Filed: Aug. 13, 2009

(65) Prior Publication Data
US 2010/0067353 A1  Mar. 18, 2010

(30) Foreign Application Priority Data
Sep. 16, 2008  (JP) .................... 2008-235852

(51) Int. Cl.
*G11B 7/00* (2006.01)
(52) U.S. Cl. .................... 720/688; 369/112.23
(58) Field of Classification Search ............. 369/112.23; 720/688
See application file for complete search history.

(56) References Cited

U.S. PATENT DOCUMENTS
| | | | |
|---|---|---|---|
| 2005/0013213 A1* | 1/2005 | Fujita | 369/44.15 |
| 2007/0147197 A1* | 6/2007 | Huang et al. | 369/44.15 |
| 2010/0067353 A1 | 3/2010 | Ochi | |

FOREIGN PATENT DOCUMENTS
| | | |
|---|---|---|
| CN | 101676759 | 3/2010 |
| JP | 11-191228 | 7/1999 |
| JP | 2002-358675 | 12/2002 |
| JP | 2005-038496 | 2/2005 |
| JP | 2005-310237 | 11/2005 |
| JP | 2006-004485 | 1/2006 |
| JP | 2010-73225 | 4/2010 |

\* cited by examiner

*Primary Examiner* — Aristotelis Psitos
(74) *Attorney, Agent, or Firm* — Antonelli, Terry, Stout & Kraus, LLP.

(57) ABSTRACT

An objective lens actuator comprises a lens holder for attaching an objective lens thereon, a piece of focusing coil, being wound along side surface of the lens holder around the objective lens, and three magnets, being disposed opposing to two surfaces each having a normal line perpendicular to both a focusing direction and a tracking direction, among four side surfaces of the lens holder, wherein the three magnets are aligned, continuously, along the tracking direction, differing a polarity thereof from one another, and width of the magnets on both outsides is wider than width of the magnet inside, or alternately, one magnet, being disposed opposing to two surfaces each having a normal line perpendicular to both a focusing direction and a tracking direction, among four side surfaces of the lens holder, wherein the magnet is magnetized into three poles along the tracking direction, and among the three poles, width of the poles on both outsides is wider than width of the pole inside.

4 Claims, 5 Drawing Sheets

OBJECTIVE LENS ACTUATOR AND A DISC APPARATUS APPLYING THE SAME THEREIN

BACKGROUND OF THE INVENTION

The present invention relates to an objective lens actuator, for fitting a focus position of an objective lens upon an target track on a recording surface of an optical disc, with driving the objective lens into a focusing direction and a tracking direction, so as to conduct reproducing or recording of information, which is recorded on the recording surface of the optical disc, and also a disc apparatus applying the same therein.

With the disc apparatus for recording information onto a disc-like information recording medium, or for reproducing the information recording thereon, an improvement of data transfer rate is achieved by rotating the optical disc with high speed. In the disc apparatus is mounted an objective lens actuator for driving the objective lens into the focusing direction and the tracking direction, so as to record and reproduce the information, correctly, with following a track on the optical disc.

In general, such objective lens actuator is constructed with a magnetic circuit, including a yoke and a permanent magnet, a moving portion including an objective lens and a driving coil attached therewith, a stationary or fixed portion for holding this moving portion thereon, and supporting members for elastically supporting the moving portion, which is connected with the fixed portion. When current flows through a focusing coil, within the magnetic field produced by the magnetic circuit including the yoke and the permanent magnet, then an electro-magnetic force is generated, and thereby the moving portion is driven into the focusing direction. In the similar manner, when current flows through a tracking coil, within the magnetic field produced by the magnetic circuit including the yoke and the permanent magnet, then an electro-magnetic force is generated, and thereby the moving portion is driven into the tracking direction.

For such the objective lens actuator, the following three (3) characteristics are required, mainly. First of all, for achieving a high accuracy positioning control while suppressing deflections due to disturbances, such as, wobbling and/or eccentricity of the disc, etc., it is necessary to increase driving sensitivity to be high. Next, for increasing control band fitting to high-speed of rotation number of the optical disc, it is necessary to bring amplitude to be small, at high-order resonance frequency of an elastic deformation mode of the moving portion. And, for dealing with high density while suppressing an aberration, which will be a cause of signal deterioration, it is necessary to reduce the tilt of the objective lens.

Among of those, in particular, relating to the driving sensitivity, there is already known an objective lens actuator, wherein a magnet is constructed with a first wide-width magnetic pole located at a center along the tracking direction, and second magnetic poles on both sides thereof, putting the first magnetic pole between them, and two (2) sides of the tracking coils provided in plural numbers thereof, on an inner side and an outer side thereof, are attached, opposing to the first magnetic pole and the second magnetic pole, respectively, thereby winding one (1) piece of the focusing coil around a peripheral side surface of the moving portion, and also a boundary portion between the magnetic poles of the magnet is disposed outside than the both side edges of the yoke (an example shown in the following Patent Document 1). With this, in the focusing direction, it is possible to increase a number of magnetic fluxes crossing the focusing coil, and also in the tracking direction, it is possible to generate driving forces on both sides, i.e., an inner side and an outer side of each tracking coil; thereby achieving an improvement of the driving sensitivity.

[Patent Document 1] Japanese Patent Laying-Open No. 2005-38496 (2005) (Claim 1 and FIG. 2).

BRIEF SUMMARY OF THE INVENTION

In relation to the high-order resonance of the objective lens actuator, there is a bending vibration of a lens holder. Within such the magnetic circuit, i.e., widening the width of the inside magnet while narrowing the width of the outside magnet, as is in the prior art mentioned above, since a main electro-magnetic force in the focusing direction is applied on a loop of vibration when the bending vibration is generated on the lens holder, there is a possibility of exciting the vibration, and thereby enlarging the amplitude thereof.

An object of the present invention is to provide an objective lens actuator, for suppressing the amplitude of vibration of the objective lens, in relation to the bending vibration of the lens holder, and further for suppressing a tilt of a lens, in relation to an operation tilt, as well as, to provide a disc apparatus for enabling high-density and high-speed in recording of information onto the disc.

The object mentioned above, according to the present invention, is accomplished by an objective lens actuator, comprising: a lens holder for attaching an objective lens thereon; a piece of focusing coil, being wound along side surface of said lens holder around said objective lens; and three magnets, being disposed opposing to two surfaces each having a normal line perpendicular to both a focusing direction and a tracking direction, among four side surfaces of said lens holder, wherein said three magnets are aligned, continuously, along the tracking direction, differing a polarity thereof from one another, and width of the magnets on both outsides is wider than width of the magnet inside.

And, the object mentioned above is accomplished by the objective lens actuator, as described in the above, wherein among said three magnets, the width of the magnets on both outsides is 1.3 to 4.3 times wider than the width of the magnet inside.

Also, according to the present invention, the object mentioned above is accomplished by an objective lens actuator, comprising: a lens holder for attaching an objective lens thereon; a piece of focusing coil, being wound along side surface of said lens holder around said objective lens; and one magnet, being disposed opposing to two surfaces each having a normal line perpendicular to both a focusing direction and a tracking direction, among four side surfaces of said lens holder, wherein said magnet is magnetized into three poles along the tracking direction, and among said three poles, width of the poles on both outsides is wider than width of the pole inside.

And, the object mentioned above, is accomplished by the objective lens actuator, as described in the above, wherein among said three poles, the width of the poles on both outsides is 1.3 to 4.3 times wider than the width of the pole inside.

According to the present invention mentioned above, it is possible to provide the objective lens actuator for suppressing the amplitude of vibration of the objective lens, in relation to the bending vibration of the lens holder, and further for suppressing the tilt of the lens, in relation to the operation tilt, as well as, to provide the disc apparatus for enabling the high-density and the high-speed in recording of information onto the disc.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Embodiment 1

Figure 1:
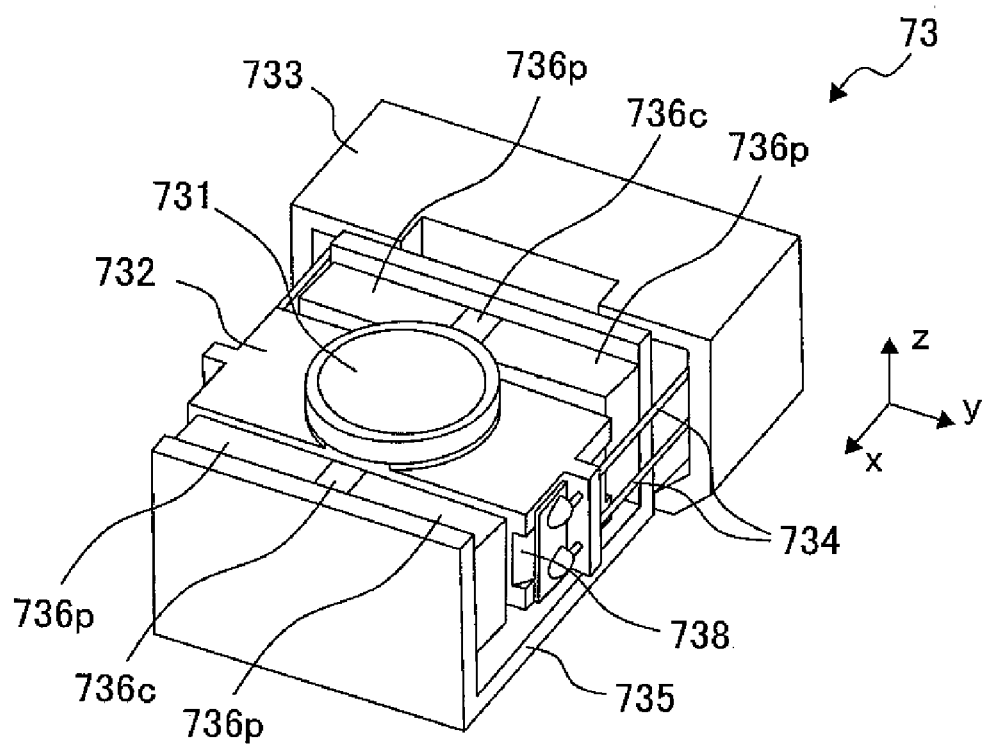
FIG. 1 is a perspective view of an objective lens actuator, according to an embodiment of the present invention.

FIG. 1 is a perspective view of an objective lens actuator 73, according to the present invention.

In this FIG. 1, an x-axis direction is same to a tangential direction of an optical disc not shown in the figure, a y-axis direction is a radius direction of the optical disc, i.e., a tracking direction, and a z-axis direction is an optical axis direction of an objective lens 731, i.e., a focusing direction, respectively. Also, in the same figure, with respect to an objective lens 2, a direction of approaching to an optical disc not shown in the figure is defined to be an upper direction and a direction of going away from is a lower direction, respectively. The objective lens actuator 73 is made up with a moving portion, on which the objective lens 731 is attached, a stationary or fixed portion 733 for holding that moving portion thereon, a supporting member 734, being connected with the fixed portion 733, for elastically supporting the moving portion, and a magnetic circuit including a yoke 735 and magnets 736p and 736c.

An end of the wire-like supporting member 734 is fixed in the vicinity of an end surface of the fixed portion 733, while the other end thereof is fixed to projecting portions, which are provided on both ends of the lens holder 732 with using a solder, etc. The objective lens 731 is attached on an upper surface of the lens holder 732. Also, upon two (2) side surfaces of the lens holder 732 in the x-axis direction, putting the objective lens 731 between them, there are attached or adhered tracking coils not shown in the figure, and further a focusing coil 738 is wound along a side surface of the lens holder 732. Herein, the objective lens 731, the lens holder 732 and the focusing coil 738 build up the moving portion. Thus, this moving portion is moved with respect to the fixed portion 733.

Figure 2:
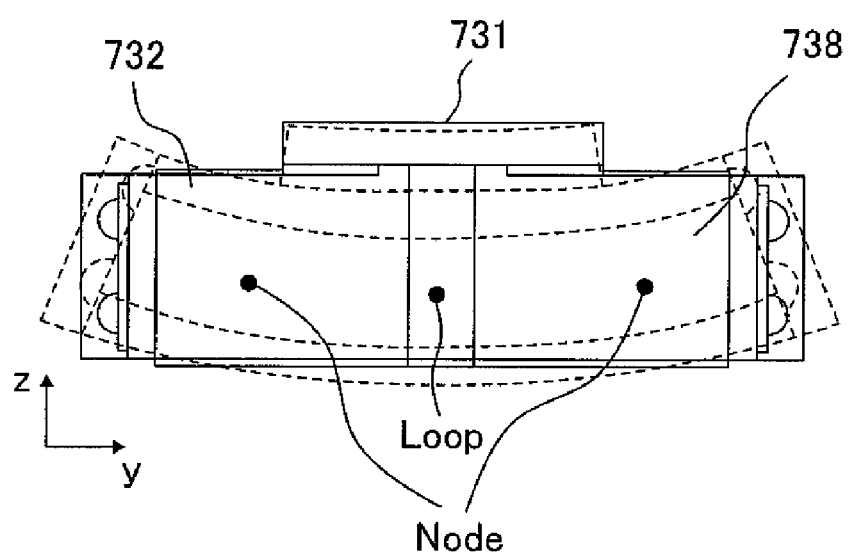
FIG. 2 is a view for showing deformation of a lens holder in a bending mode thereof.
Figure 3:
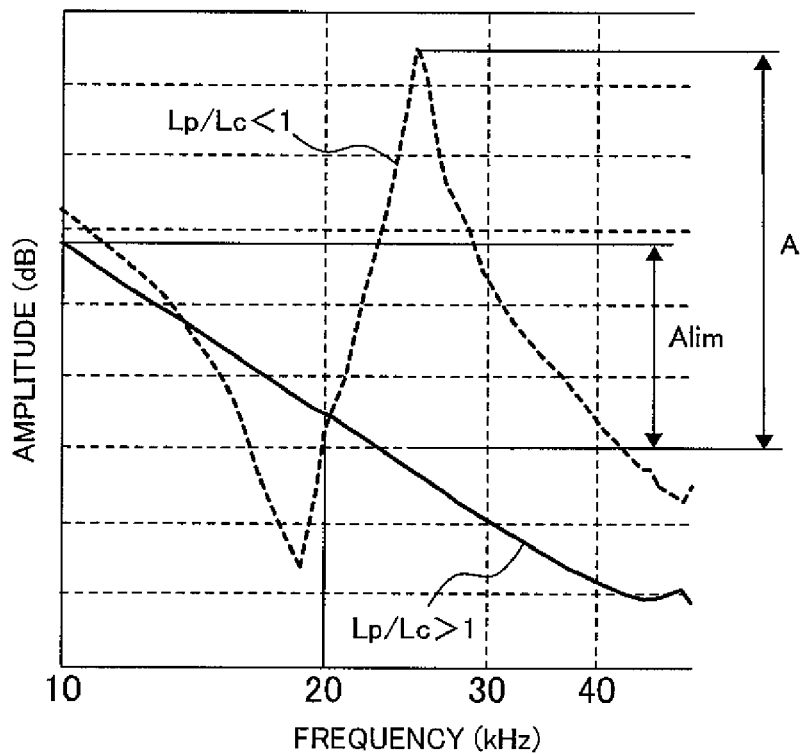
FIG. 3 shows a frequency response characteristic of the objective lens, according to the embodiment of the present invention, to deflection in the focusing direction thereof.

In such the objective lens actuator, the lens holder 732 has a box-like shape of a rectangular parallelepiped, being opened on the lower surface thereof. The bending vibration of such the lens holder 732 is in a vibration mode of elastically deforming the lens holder as is shown by broken lines in FIG. 2, and this can be excited easily when generating an electro-magnetic force on the focusing coil 738 of the moving portion. FIG. 3 shows a frequency response characteristic of the objective lens 731, to the deflection in the focusing direction when generating the electro-magnetic force on the focusing coil 738. In the graph, a mark "A" represents an amount or volume of increase of amplitude of the objective lens 731 due to the bending vibration of the lens holder 732. The increase amount "A" of amplitude of the objective lens 731 due to that bending vibration can be expressed in the form of calculating products, between a mode component of the bending vibration of the objective lens 731, an electro-magnetic force on the focusing coil 738, and a mode component of the bending vibration at a point of action thereof, and adding them for the number of the points of actions of the electro-magnetic forces. Accordingly, in order to lessen the increasing amount "A" of amplitude of the objective lens 731 due to that bending vibration, it is enough to fit the point of action of the main electro-magnetic force acting upon the focusing coil 738 to a node of the vibration.

Figure 4:
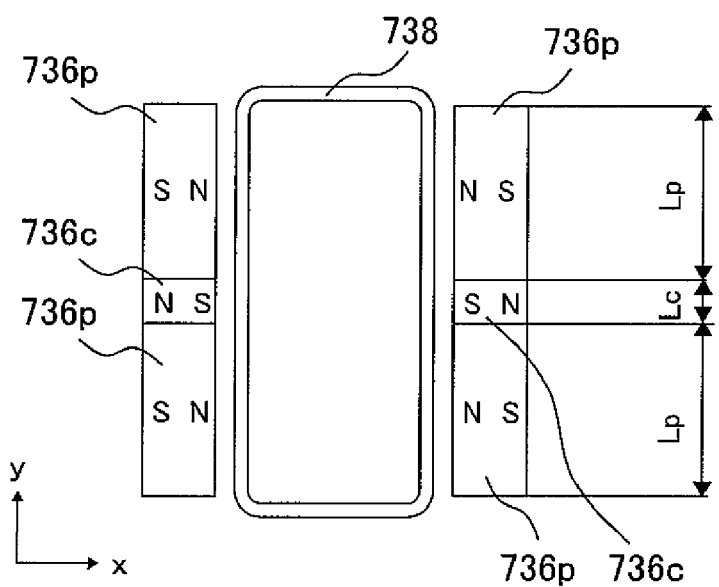
FIG. 4 is an upper plane view of a focusing coil and three magnets, according to the embodiment of the present invention.

For a guideline mentioned above, the feature of the present embodiment lies in that, as is shown in FIG. 4, three (3) magnets are aligned in the tracking direction, i.e., the y-axis direction, differing the polarity thereof from one another, and width "Lp" of the magnets 736p on both outsides of those three (3) magnets is wider than width "Lc" of an inside magnet 736c. In this case, the electro-magnetic force generating on the focusing coil 738 when current flows through the focusing coil 738 has a negative component "f" in the z-axis direction acting at the position opposing to the inside magnet 736c having narrow width, in addition to positive components "F" in the z-axis direction acting at the respective positions opposing to the magnets 736p having wide width on both outsides. In case when density of the magnetic flux is same, then the electro-magnetic force comes to be larger at the position opposing to the magnet having wide width. Therefore, in the case of this embodiment, the two (2) electro-magnetic forces "F" on both outsides are larger than the negative component "f" inside in the z-axis direction, and those two (2) electro-magnetic forces "F" on both outsides come to be a driving force for driving the moving portion in the focusing direction.

Figure 5:
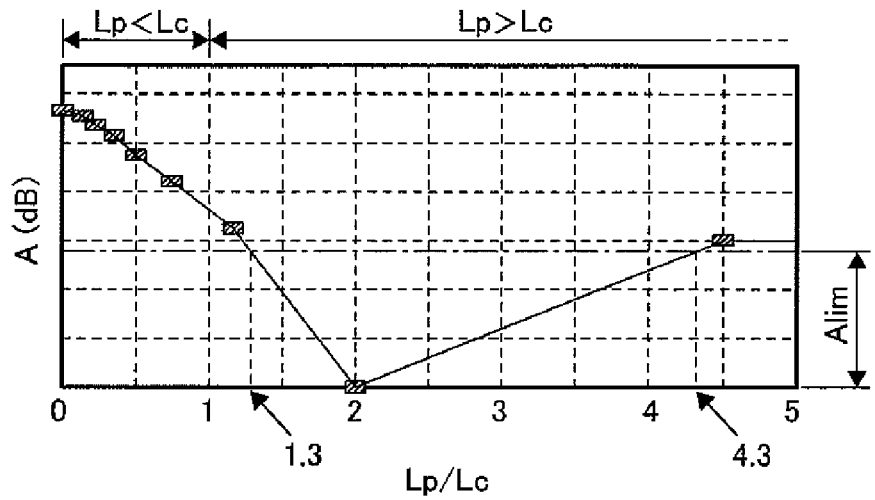
FIG. 5 is a graph for showing an effect of the embodiment of the present invention.

An effect is shown in FIG. 5, which can be obtained by applying the main electro-magnetic forces in the focusing direction at the positions on both outsides of the focusing coil 738 while reducing the electro-magnetic force in the focusing direction acting at the position inside, in this manner. FIG. 5 shows a result of calculation of the increasing amount "A" of amplitude of the objective lens 731 due to the bending vibration, while changing a ratio between the width "Lp" of the magnets 736p in the tracking direction and the width "Lc" of the magnet 736c in the tracking direction. Thus, a region where the value on the horizontal axis is larger than one (1) corresponds to the structures of the present embodiment. In the figure, there is also shown an upper limit value "Alim." for the increasing amount "A" of amplitude, in the high-order resonance frequencies, together with.

The an upper limit value "Alim." is a value, which is caused due to a necessity of suppressing the amplitude in the high-order resonance frequencies to be equal or lower than the amplitude at 10 kHz, for the purpose of increasing the control band. As is shown in the graph, it is possible to reduce the increasing amount "A" of amplitude of the objective lens 731 due to the bending vibration when the ratio between "Lp" and "Lc" is larger than one (1), comparing to that when the ratio between "Lp" and "Lc" is smaller than one (1). Further, in case when the ratio between "Lp" and "Lc" is around two (2), it is possible to bring the point of action of the main electromagnetic force "F" acting upon the focusing coil 738 to coincide with the position of the node of the bending vibration; therefore, it is possible to lower the increasing amount "A" of amplitude of the objective lens 731 due to the bending vibration, down to nearly zero (0). Herein, the region where the increasing amount "A" of amplitude does not exceed the upper limit value "Alim." lies between 1.3 to 4.3 of the ratio between Lp" and "Lc".

Figure 6:
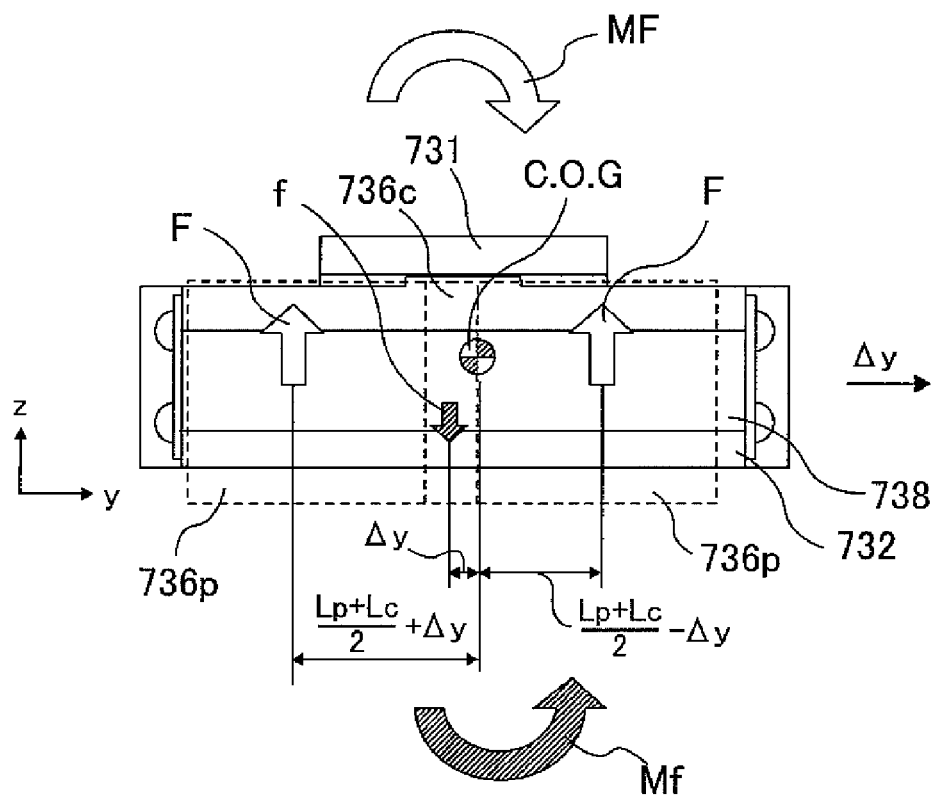
FIG. 6 is a view for explaining a point of action and a rotating moment of electro-magnetic force in a focusing direction, when a moving portion is shifted into a tracking direction, in the embodiment of the present invention.

Next, explanation will be made on other one effect of the present invention, i.e., reducing the operation tilt. FIG. 6 illustrates the electro-magnetic force in the z-axis direction generating on the focusing when current flows through the focusing coil 738, under the condition that the moving portion of the objective lens actuator, according to the present invention, moves by only Δy in the y-axis direction from the neutral condition. As is shown in the figure, when the objective lens 731 moves by only Δy in the y-axis direction, the gravity "C.O.G" of the moving portion comes off from the position of a center of the magnetic circuit, which is constructed with the magnet 736c and the magnets 736p and the yoke 735. When current flows through the focusing coil 738 under this condition, also the electro-magnetic force generating on the focusing coil 738 act, asymmetrically, with respect to the gravity "C.O.G" of the moving portion.

However, with the present embodiment, also the negative component "f" in the z-axis direction acts at the position opposing to the inside magnet 736c having narrow width, in addition to the positive components "F" in the z-axis direction acting at the respective positions opposing to the magnets 736p having wide width on both outsides of the focusing coil 738. For this reason, moment of rotation "Mf" due to the secondary negative electro-magnetic force "f" in the z-axis direction acting at an inside of the focusing coil 738 cancels unbalance "MF" of moment of rotation due to the main positive electro-magnetic forces "F" in the z-axis direction acting on both outsides of the focusing coil 738, and therefore there is hardly generated a moment for rotating the moving portion. In this manner, because of the feature of the present embodiment, it is possible to reduce the moment of rotation generating on the focusing coil 738, even when the objective lens moves, and therefore it is also possible to reduce the tilt of the objective lens 731 down to be small.

Figure 7:
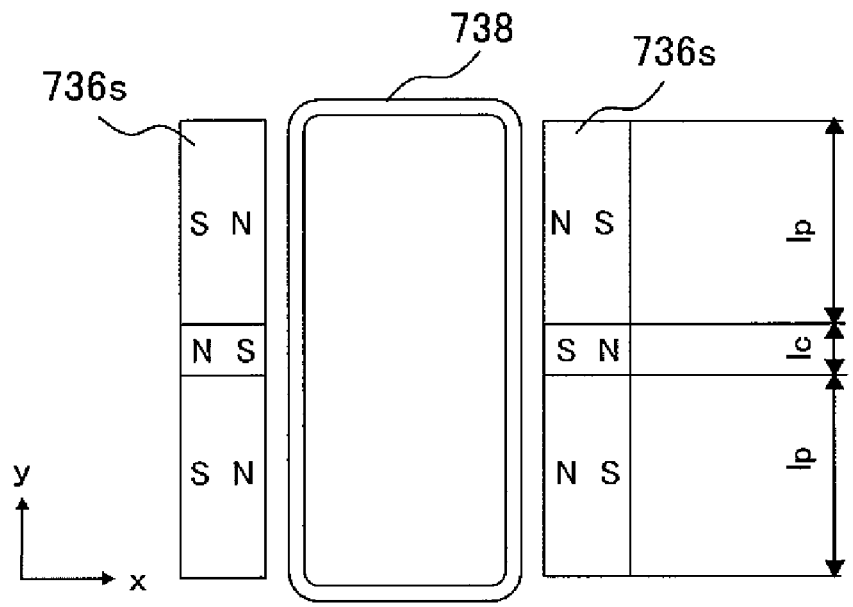
FIG. 7 is an upper plane view of the focusing coil and the permanent magnet, according to other embodiment of the present invention.

However, in the present embodiment, as is shown in FIG. 4, the three (3) magnets 736c and 736p are aligned, continuously, along the tracking direction, differing the polarity from one another, and the width "Lp" of the magnets on both outsides of those three (3) magnets is wider than the width "Lc" of the magnet "Lc" inside; but the similar effect can be obtained by magnetizing one (1) piece of magnet 736s into three (3) poles along the tracking direction, as is shown in FIG. 7, while broadening width "lp" of the magnetic poles on both outsides of those three (3) magnetic poles to be wider than width "lc" of the magnetic pole inside.

Embodiment 2

Figure 8:
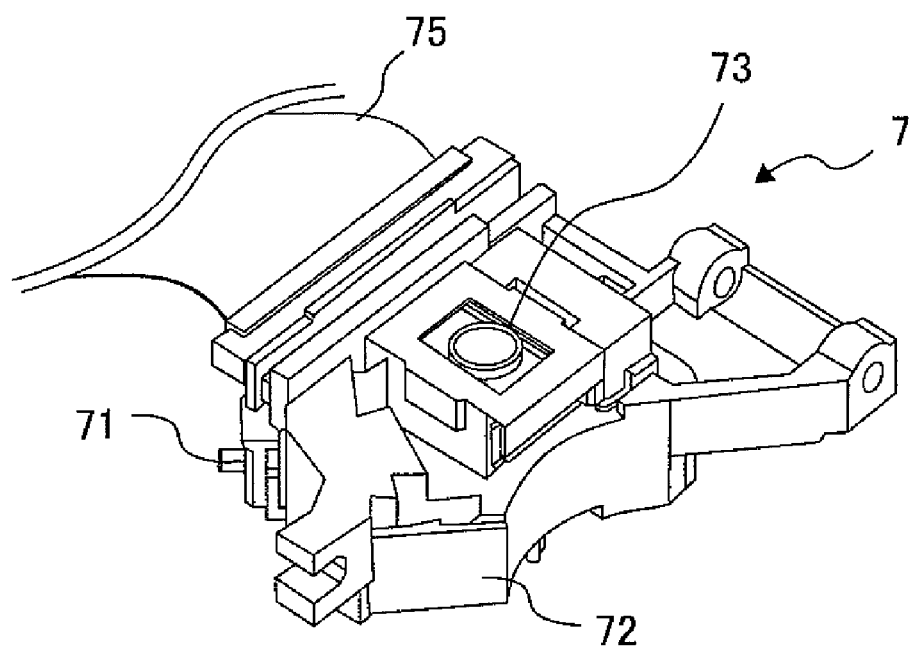
FIG. 8 is a perspective view of an optical head mounting the objective lens actuator according to the present invention therein.

FIG. 8 is a perspective view of an optical head 7 applying the objective lens actuator 73 according to the present invention therein. The optical head 7 is a device for recording or reproducing information onto/from a disc, and is constructed with three (3) components, mainly, i.e., the objective lens actuator 73, an optic system and a flexible printed circuit board 75. The optic system comprises a laser diode 71 functioning as a light source, an objective lens for focusing an emission light upon the recording surface of the disc, an optical element for producing/detecting an error signal for use of control, and an optical detector 72 for converting change of the reflection light from the disc into an electric signal, and so on. The flexible printed circuit board 75 electrically connects the objective lens actuator 73 and the optic system with a controller circuit and a signal processing circuit with using plural numbers of printed wiring patterns. With mounting the objective lens actuator 73 according to the present invention, as in the present embodiment, it is possible for the optical head 7 to obtain optical and signal characteristics, being preferable through a wide operation range of the moving portion, up to a high-frequency region.

Embodiment 3

Figure 9:
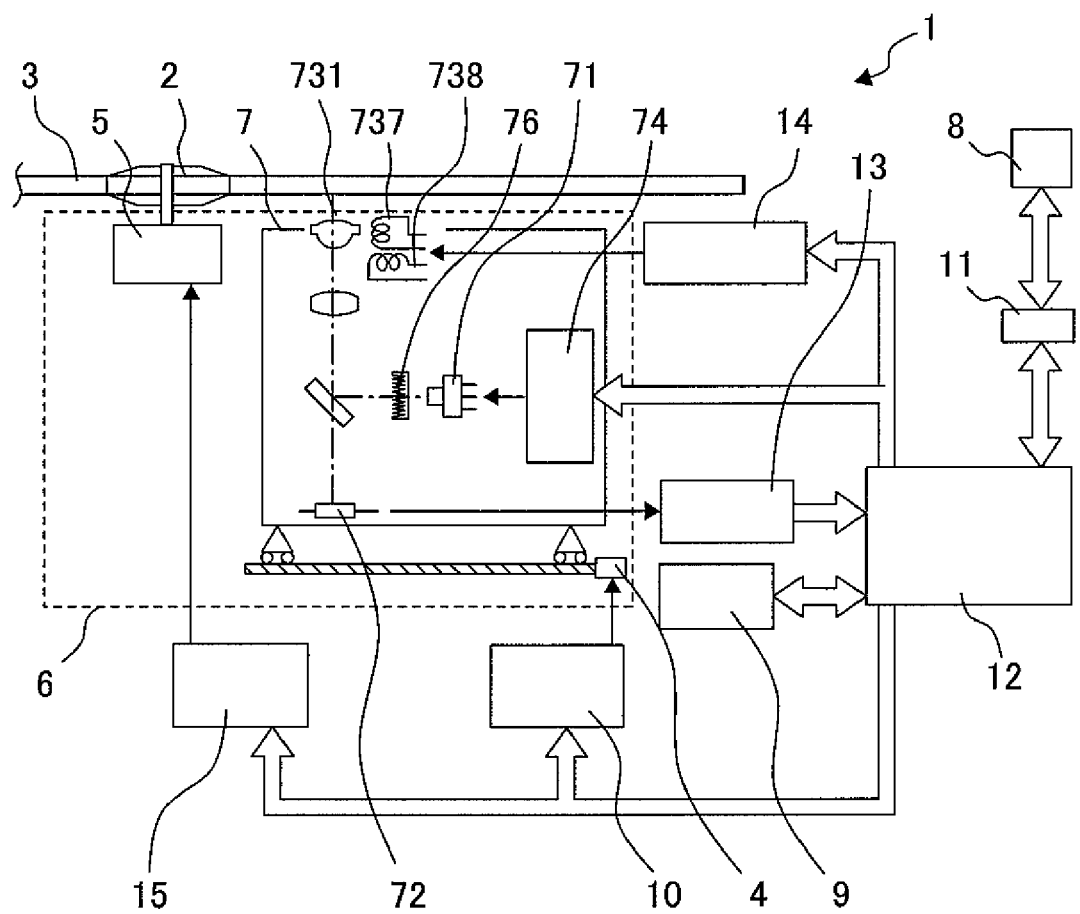
FIG. 9 is a block diagram of a disc apparatus mounting the objective lens actuator according to the present invention therein.

FIG. 9 is a block diagram of a disc apparatus 1 applying the objective lens actuator 73 according to the present invention therein. The disc apparatus 1, being made up with a unit mechanism 6 and the controller circuit, communicates with a PC (Personal Computer) 8 or the like through an interface 11. The unit mechanism 6 is a mechanism for keeping an angle and a distance, accurately, between the optical head 7, which is made up with a spindle motor 5, the optical head 7, a feed motor 4 and a mechanical chassis. The controller circuit is mainly constructed with a CPU 16, ROM and RAM, and it conducts control of each portion upon basis of the signals from the optical detector 72 and/or a spindle motor driver circuit 15.

First of all, explanation will be made on the constituent elements of the unit mechanism 6. The spindle motor 5 is a motor for rotating a disc 3, on which a turntable 2 is provided for loading the disc 3 thereon, with lessening the wobbling and/or the eccentricity of the disc 3. The feed motor 4 is a motor for moving the optical head 7 to a desired position in the radius direction of the disc along a guide bar as a reference. The mechanical chassis holds the parts mentioned above thereon, and is attached on a main body of the disc apparatus 1 through an insulator, which is made of an elastic material. Next, explanation will be made on the controller circuit. An objective lens driver circuit 14 receives a focusing error signal and a tracking error signal responding to light-receiving signals from the optical detector 72, and controls current to be outputted into the focusing coil 738 and the tracking coil 737.

The feed motor driver circuit 10 conducts a feed control of the optical head 7 upon basis of the signals mentioned above, i.e., such a control that the optical head 7 is always located at an appropriate position. The spindle motor driver circuit 15 conducts a rotation control of the spindle motor. The laser driver circuit 74 receives the information as an irradiation pattern of laser beam, and controls a power of the laser beam, which the laser diode 71 irradiates. Because of using the optical head 7, mounting the objective lens actuator according to the present invention therein, this disc apparatus is able to conduct the recording of information onto a high-density disc or to reproduce the information of the disc 3, at high speed.

In relation to the high-order resonance of the objective lens actuator, since the main electro-magnetic force in the focusing direction is applied in the vicinity of the node of vibration even when the bending vibration is generated on the lens holder, then the vibration comes to be dormant. Accordingly, it is possible to reduce the amplitude of vibration of the objective lens.

Further, in relation to the operation tilt, even when the moving portion is moved, among those three (3) electro-magnetic forces, since the moment of rotation due to the secondary electro-magnetic force acting at the inside of the focusing coil cancels unbalance of the moment of rotation due to the main electro-magnetic forces acting on both outsides of the focusing coil, therefore the moment of rotation acting upon the focusing coil as a whole comes to be small. Accordingly, it is possible to provide the objective lens actuator having a small tilt of the objective lens.

With such present invention as was mentioned above, it is possible to provide the objective lens actuator for suppressing the amplitude at the position of the objective lens, in relation to the bending vibration of the lens holder, and further for suppressing the tilt of the objective lens, in relation to the operation tilt, and also within the disc apparatus applying the same therein, to achieve the high-density and the high-speed of the information recording onto the disc.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An objective lens actuator, comprising:
    a lens holder for attaching an objective lens thereon, the lens holder having a box-like shape of a rectangular parallelepiped which is opened on a lower surface thereof;
    a piece of focusing coil, being wound along side surface of said lens holder around said objective lens; and
    three magnets, being disposed opposing to two surfaces each having a normal line perpendicular to both a focusing direction and a tracking direction, among four side surfaces of said lens holder;
    wherein said three magnets are aligned, continuously, along the tracking direction, differing in polarity thereof from one another, and a width of the magnets on both outsides is wider than a width of the magnet inside; and
    wherein among said three magnets, the width of the magnets on both outsides is 1.3 to 4.3 times wider than the width of the magnet inside.

2. The objective lens actuator, as described in the claim 1, wherein said three magnets are configured so as to enable suppression of an amplitude of vibration of the objective lens in relation to bending vibration of the lens holder.

3. An objective lens actuator, comprising:
    a lens holder for attaching an objective lens thereon, the lens holder having a box-like shape of a rectangular parallelepiped which is opened on a lower surface thereof;
    a piece of focusing coil, being wound along side surface of said lens holder around said objective lens; and
    one magnet, being disposed opposing to two surfaces each having a normal line perpendicular to both a focusing direction and a tracking direction, among four side surfaces of said lens holder;
    wherein said magnet is divided into three sections and magnetized along the tracking direction, differing in polarity from one another, and among said three sections, a width of the sections on both outsides is wider than a width of the section inside; and
    wherein among said three sections, the width of the sections on both outsides is 1.3 to 4.3 times wider than the width of the section inside.

4. The objective lens actuator, as described in the claim 3, wherein said three sections are configured so as to enable suppression of an amplitude of vibration of the objective lens in relation to bending vibration of the lens holder.

* * * * *